United States Patent [19]

Ward et al.

[11] Patent Number: 4,815,383

[45] Date of Patent: Mar. 28, 1989

[54] LOW COST COMPOSITE MISSILE STRUCTURE

[75] Inventors: Stephen H. Ward; John T. Monahan; Daniel N. Giles, all of Seattle, Wash.

[73] Assignee: The Boeing Company, Seattle, Wash.

[21] Appl. No.: 87,296

[22] Filed: Aug. 20, 1987

[51] Int. Cl.[4] .............................................. F42B 15/00
[52] U.S. Cl. ..................................... 102/293; 102/374
[58] Field of Search ............... 102/293, 374, 377, 378; 244/117 R, 119, 120, 125, 126, 129.1, 131, 132

[56] References Cited

U.S. PATENT DOCUMENTS

| | | | |
|---|---|---|---|
| 2,627,231 | 2/1953 | Kraemer | 102/374 |
| 2,686,473 | 8/1954 | Vogel | 102/378 |
| 2,976,806 | 3/1961 | Risk et al. | 102/374 |
| 2,996,985 | 8/1961 | Kratzer | 102/378 |
| 3,345,946 | 10/1967 | Johnson et al. | 102/377 |
| 3,502,529 | 3/1970 | Borgnolo et al. | 156/172 |
| 3,615,999 | 10/1971 | Basler | 156/172 |

FOREIGN PATENT DOCUMENTS 552437  4/1943  United Kingdom .

Primary Examiner—Charles T. Jordan
Attorney, Agent, or Firm—Finnegan, Henderson, Farabow, Garrett, & Dunner

[57] ABSTRACT

A missile body and related method for producing a missile body comprising a plurality of coaxially disposed contiguous body sections wherein each body section is a structure having a cross-sectional configuration corresponding to a respective cross section of the missile body, means for fixedly attaching the contiguous body sections together axially to form a hull, and an outer skin physically engaging the hull and constituting the outer skin of the missile body.

6 Claims, 3 Drawing Sheets

LOW COST COMPOSITE MISSILE STRUCTURE

BACKGROUND OF THE INVENTION

The present invention relates to a missile body and a related method, and more particularly to an improved missile body of composite materials having utility for jet, rocket, and rocket-ramjet missiles.

Composite materials such as graphite/epoxy have been investigated for use in missile bodies to increase missile performance. Composite materials weigh less than conventional metallic materials, and weight savings in the missile body directly increase missile range and performance. The application of composite material technology to many missile designs, however, presents fabrication problems.

For example, conventional fabrication of rocket-ramjet missile bodies requires the fabrication and hand assembly of many component parts. Rocket-ramjet missiles include a rocket solid propellant system and, in addition, carry liquid fuel that is burned when the solid propellant is exhausted. Thus, provision must be made in the rocket-ramjet missile for storage of liquid fuel. In a typical rocket-ramjet design, the fuel is stored between the outer skin and an inner wall of the missile, and the inner wall defines a motor case/combustion chamber. The outer skin and inner wall are supported by longerons and bulkheads.

Conventional fabrication of rocket-ramjet missile bodies using composite materials requires that the outer skin, inner wall, longerons, and bulkheads be separately fabricated and cured. For example, in the case of the outer skin, a mandrel must be constructed around which the outer skin is fabricated and cured. The outer skin is then cut from the mandrel into two halves for hand assembly with the other components. The assembly of the various components is particularly difficult because the missile design requires close tolerances to ensure structural integrity. The tight tolerances combined with the hand lay up fabrication make such conventional fabrication labor intensive and expensive. As a result, composite materials have not yet been incorporated into a production rocket-ramjet missile or into many other missile designs.

SUMMARY OF THE INVENTION

The objects of the present invention include the design and production of a missile body that accommodates the use of composite materials, reduces fabrication costs, and improves structural integrity. The present invention overcomes the problems and disadvantages of the prior art by employing body sections having a cross-sectional configuration corresponding to a respective cross section of the missile body. The body sections are bonded together axially, and the missile body is then covered with an outer skin.

The advantages of the present invention include a reduction in fabrication costs of approximately an order of magnitude compared to an equivalent hand laid up composite skin and frame assembly. The invention eliminates the tooling required to form the outer skin since the skin is placed directly on the assembly of body sections. The invention also eliminates the close tolerance fit-ups that would be required of hand laid up structures. For example, because the outer skin is cured directly on the body sections, the frame to skin fit-up difficulties with the conventional hand laid up structure are eliminated.

In addition, the present invention improves structural integrity by eliminating the tension peel stress loading that occurs between the skin and frames in the conventional structure. This results from the continuity of the walls and frames of the body sections.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects in accordance with the claimed invention, as embodied and broadly described herein the missile body of this invention comprises a plurality of coaxially disposed contiguous body sections wherein each body section is a structure having a cross-sectional configuration corresponding to a cross section of the missile body, means for fixedly attaching the contiguous body sections axially end to end to form a hull, and an outer skin physically engaging the hull and constituting the outer covering of the missile body.

In one aspect, the body section may be formed with spaced inner and outer walls that, when the sections are joined together axially, provide an annular component that can be used to store fuel or house cables or other components.

The invention also provides a method of producing a missile body comprising the steps of making body sections having a cross-sectional configuration corresponding to a respective cross section of the missile body, fixedly attaching a plurality of coaxially disposed contiguous body sections together axially to form a hull, and covering the hull with an outer skin.

It is to be understood that both the foregoing general description and the following detailed description are exemplary and explanatory only and are not restrictive of the invention as claimed.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Figure 1:
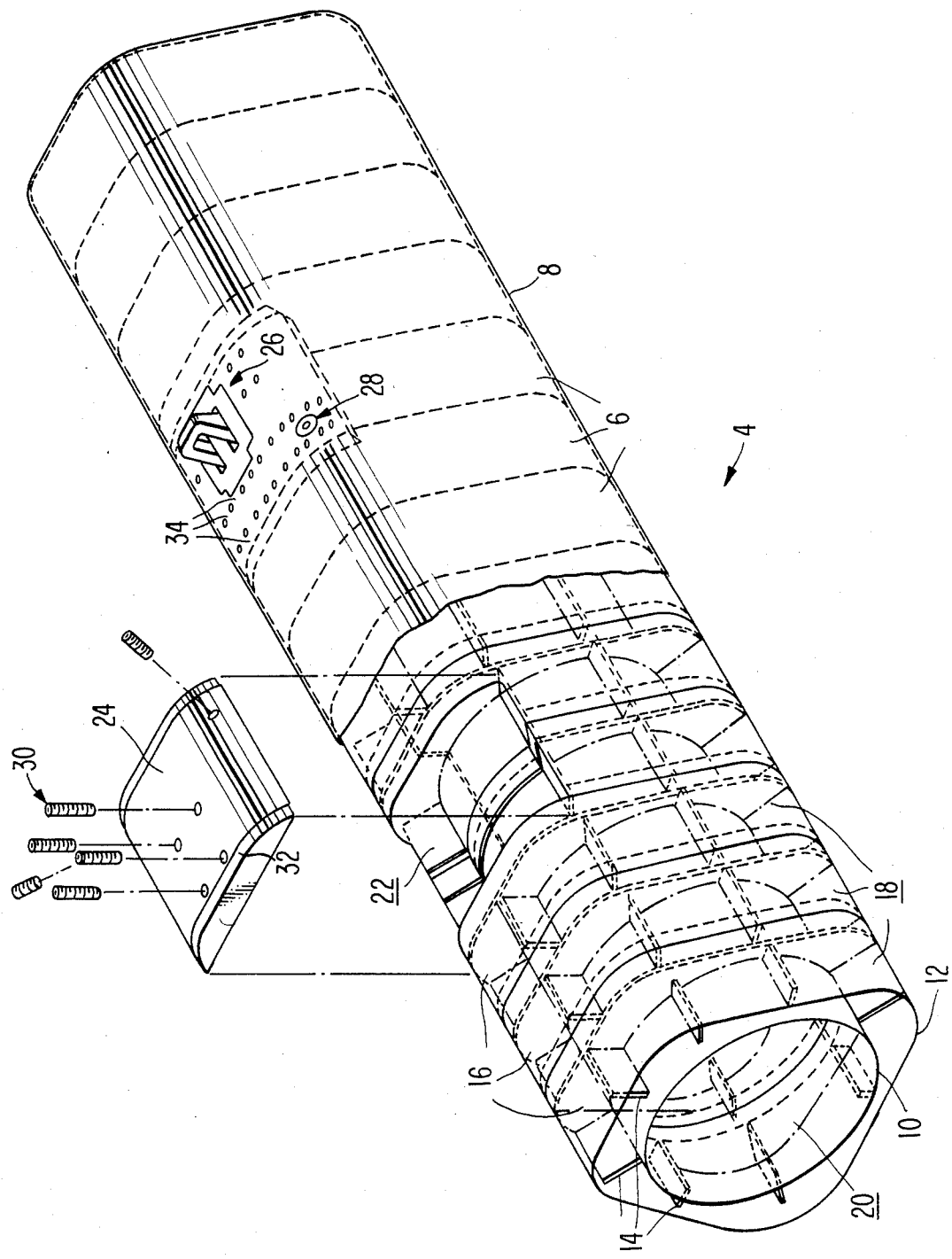
FIG. 1 is a view in perspective illustrating a plurality of missile body sections bonded together and partially covered with a filament wound outer skin.

Reference will now be made in detail to the present preferred embodiment of the invention, an example of which is illustrated in the accompanying drawings, wherein like reference numerals refer to similar parts.

The preferred embodiment of the missile body of the invention is shown in FIG. 1 and is represented generally by the numeral 4. This missile body includes a plurality of coaxially disposed contiguous body sections 6 wherein each body section is a structure having a cross-sectional configuration corresponding to a respective cross section of the missile body. The preferred method of making the body sections is by injection molding but other methods, such as extrusion, blow molding, roto-molding, or casting may be used. Alternatively, body sections made by a combination of methods may be used. For example, sections made by injection molding may be alternately interspaced with sections made by another method such as extrusion. The material for the molded structure may be any suitable unreinforced or short-fiber reinforced thermoplastic or thermoset plastic material as required by the specific design conditions., The fiber reinforcements may consist of chipped glass or graphite fibers.

Figure 2:
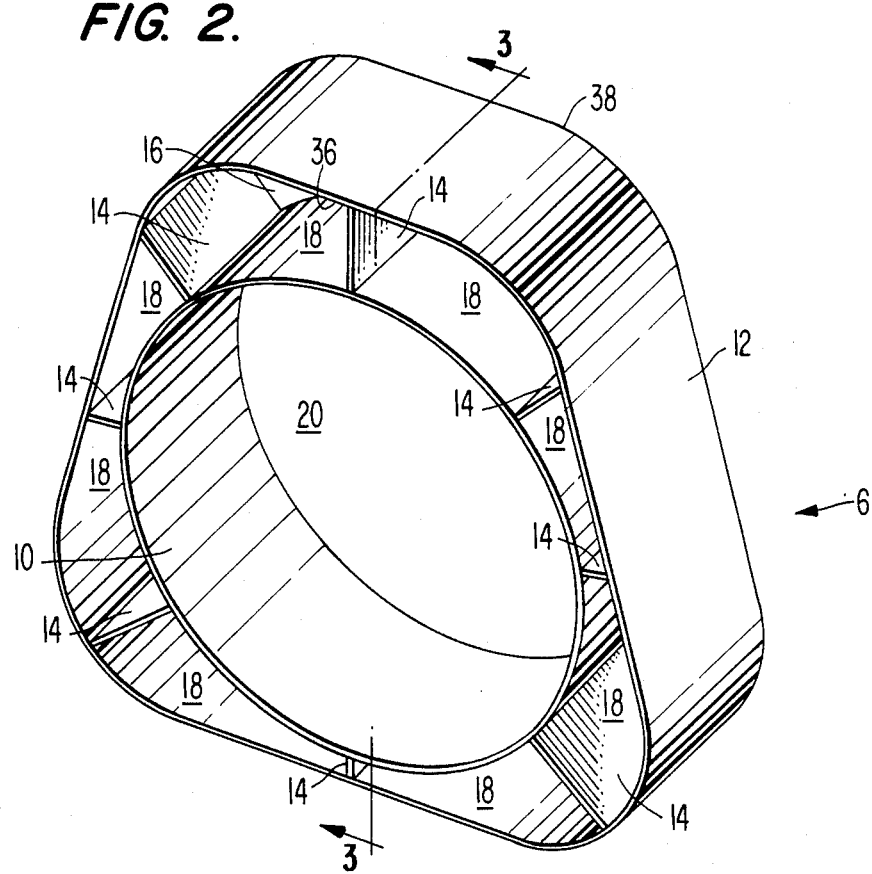
FIG. 2 is a view in perspective of a single molded missile body section in accordance with the present preferred embodiment of the invention.

As embodied herein, and as additionally represented in FIG. 2, at least half of the plurality of contiguous body sections 6 comprises an annular inner wall 10, an annular outer wall 12 surrounding and fixedly spaced from the inner wall, a plurality of angularly spaced radially extending longerons 14 joining the inner and outer walls, and an annular bulkhead 16 adjacent one edge of body section 6 and having a radially extending annulus between the inner and outer walls. The inner wall 10 is generally circular in configuration and defines an axial section of a motor case/combustion chamber 20. As embodied herein, the outer wall 12 assumes a generally trapezoidal shape. The outer wall 12, inner wall 10, and longerons 14 define fuel chambers 18.

Figure 3:
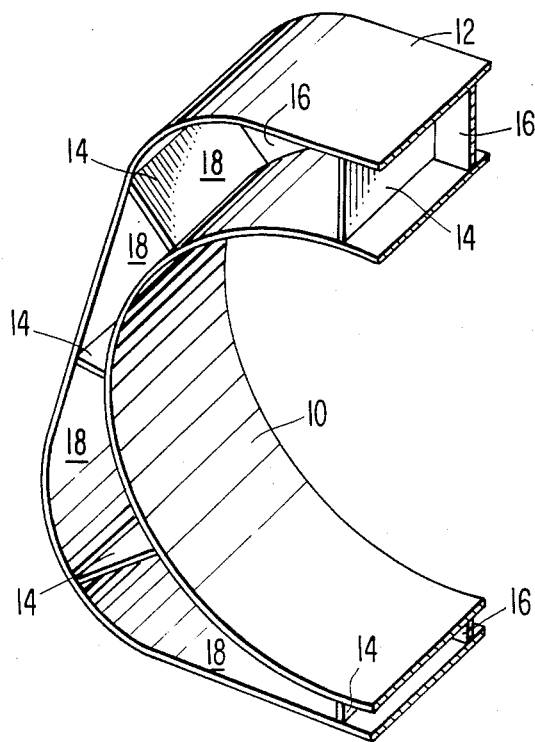
FIG. 3 is a fragmentary view in perspective of the body section of FIG. 2 cut-away on lines 3—3 of FIG. 2.

With additional reference to FIG. 3, there is shown a fragmentary view in perspective of the body section of FIG. 2. FIG. 3 best depicts bulkhead 16 that extends between outer wall 12 and inner wall 10. Bulkhead 16 provides the strength necessary to withstand the significant axial pressure loads from the accelerating column of fuel generated by a rocket-ramjet missile. In the preferred embodiment, bulkhead 16 is perforated so that fuel chambers 18 may communicate from one body section to another. In addition, bulkheads 16 may be perforated to accommodate generally axially extending piping systems for liquid fuel and for other components of the rocket-ramjet motor systems. The longerons 14 may be perforated as well.

Referring again to FIG. 1, hardpoint fitting cutouts 22 may be made in the body sections for placement of hardpoint fittings used to suspend or transport the missile. These cutouts remove portions of the outer wall 12 while leaving the inner wall 10 intact. The bulkheads 16 and longerons 14 facing the hardpoint fitting cutouts 22 must also remain intact.

As embodied herein, the hardpoint fittings comprise a metallic plate 24 machined to the contours of the body sections and inserted into the cutouts in the assembled body sections, a clevis assembly 26 which is bolted into the metallic plate, and a pair of swaybrace pads 28 which are also bolted to the metallic plate. The leading and trailing edges of metallic plate 24 are machined to form a lip 32 that fits under outer wall 12 permitting the surface of the metallic plate to be flush with the outer surface of the outer wall. Bolts 30 engage inner wall 10 to force lip 32 of metallic plate 24 against the inner surface of outer wall 12 and thereby secure the metallic plate to the assembled body sections.

As embodied herein, a recess is machined through the outer skin and into metallic plate 24 to receive clevis assembly 26. A suitable clevis assembly is disclosed in U.S. patent application Ser. No. 913,033 entitled "Clevis Assembly for Hanging Airborne Stores" filed on Sept. 29, 1986 and coassigned, which application is incorporated herein by reference.

Figure 4:
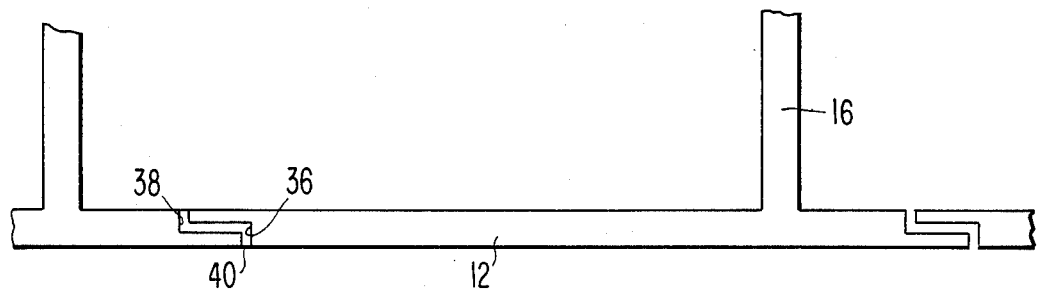
FIG. 4 is a fragmentary schematic view illustrating the edge joints of the outer wall of body sections after assembly as in FIG. 1.

In accordance with the invention, the missile body comprises means for fixedly attaching the coaxially disposed contiguous body sections to one another. With additional reference to FIG. 4, as embodied herein, the attaching means includeds an adhesive 40, such as an epoxy paste adhesive, for fixedly attaching body sections 6 in assembled relationship. In a most preferred embodiment, leading edge 36 and trailing edge 38 of outer wall 12 of the body sections are molded to create a lap joint when body sections 6 are placed in assembled relationship. The body sections may also be fused together by localized induction heating, by solvent fusing, or other suitable method.

In accordance with the claimed invention, the missile body comprises an outer skin 8 physically enggging the plurality of contiguous body sections and constituting the outer covering of the missile body. FIG. 1 depicts an assembly of body sections partially covered with outer skin 8. As embodied herein, outer skin 8 is a composite material consisting of a fiber or tape and an organic resin system and is placed directly over the assembly of body sections either by automatic winding or by hand lay up technique. In a most preferred embodiment, the outer skin is applied by an automatic filament winding process. The fiber may be glass, boron, aramid, graphite, or a combination thereof, and the resin system material may be an epoxy, a polyimide, a bismaleimide, or other suitable system. The outer skin is then cured directly on the assembly of body sections. The outer skin carries the body loads and moments and supports the outer wall 12 under pressure loadings. A series of bolts 34 is installed through the cured outer skin into metallic plate 24 to insure adequate load transfer from the hardpoint fittings to the missile body structure.

Figure 5:
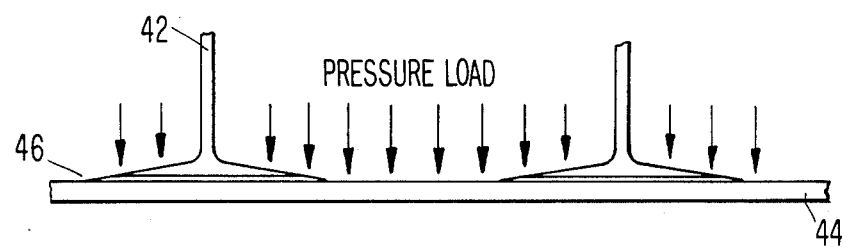
FIG. 5 is a fragmentary schematic view illustrating pressure loading of frame to skin joints of a conventional missile body.
Figure 6:
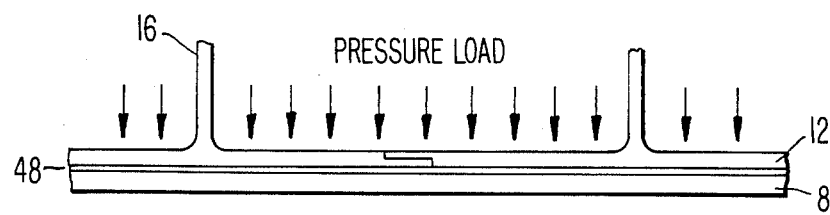
FIG. 6 is a fragmentary schematic view illustrating pressure loading of frame to skin joints of a missile body according to the present invention.

The frame to skin joints of conventional missile bodies are illustrated in FIG. 5 for comparison with the frame to skin joints of the invention illustrated in FIG. 6. In FIG. 5, the bondline 46 between frame 42 and skin 44 of conventional missile bodies is susceptible to tension peel failures. In FIG. 6, the bondline 48 between outer wall 12 and outer skin 8 of the invention is not susceptible to tension peel failures. Thus, this structural concept of the invention provides an important improvement in structural integrity.

The present invention also relates to a method of producing a missile body. In accordance with the invention, this method includes the step of making body sections having a cross-sectional configuration corresponding to a respective cross section of the missile body. The preferred method of making the body section is by injection molding, but the other methods mentioned previously can also be used. As embodied herein, each of the body sections comprises an annular inner wall, an annular outer wall surrounding and fixedly spaced from the inner wall, a plurality of angularly spaced radially extending longerons joining the inner and outer walls, and an annular bulkhead having a radially extending annulus between the inner and outer walls. In accordance with the invention, this method also includes the step of fixedly attaching the body sections together end to end to form a plurality of coaxially disposed body sections. In accordance with the invention, the method also includes the step of covering the plurality of contiguous body sections with an outer skin. As embodied herein, the outer skin is a fiber/resin composite material, and, more preferably, is applied by a filament winding. As further embodied herein, the invention includes a method of producing a rocket-ramjet missile.

It will be apparent to those skilled in the art that the above description relates to the invention of a missile body. An operative missile will, of course, include numerous additional items such as a motor, propellant, guidance system, and a warhead.

It will also be apparent to those skilled in the art that modifications and variations can be made in the missile body of the present invention without departing from the scope or spirit of the invention. As an example, the missile body of the present invention can be used for rocket-ramjet missiles as described in the preferred embodiment or for other missile structures. Thus, it is intended that the present invention cover the modifications and variations of this invention provided they come within the scope of the appended claims and their equivalents.

What is claimed is:

1. A missile body, comprising
   a plurality of coaxially disposed contiguous body sections wherein each body section is a structure having a cross-sectional configuration corresponding to a respective cross section of the missile body,
   means for fixedly attaching said contiguous body sections together axially to form a hull, and
   an outer skin comprised of a fiber/resin composite material filament wound directly onto said hull and constituting the outer covering of the missile body.

2. A missile body according to claim 1, wherein the missile is a rocket-ramjet missile.

3. A missile body according to claim 1, wherein at least half of the plurality of contiguous body sections comprise
   an annular inner wall,
   an annular outer wall surrounding and fixedly spaced from the inner wall,
   a plurality of angularly spaced radially extending longerons joining the inner and outer walls, and
   an annular bulkhead having a radially extending annulus between the inner and outer walls.

4. A method of producing a missile body comprising the steps of
   making body sections having a cross-sectional configuration corresponding to a respective cross section of the missile body,
   fixedly attaching a plurality of coaxially disposed contiguous body sections together axially to form a hull, and
   covering the hull with an outer skin comprised of a fiber/resin composite material filament wound directly onto the hull.

5. A method of producing a missile body structure in accordance with claim 4, wherein the missile is a rocket-ramjet missile.

6. A method of producing a missile body structure in accordance with claim 4, wherein at least half of the plurality of contiguous body sections comprise
   an annular inner wall,
   an annular outer wall surrounding and fixedly spaced from the inner wall,
   a plurality of angularly spaced radially extending longerons joining the inner and outer walls, and
   an annular bulkhead having a radially extending annulus between the inner and outer walls.

* * * * *